United States Patent [19]

Nalewajek et al.

[11] Patent Number: 5,534,176
[45] Date of Patent: Jul. 9, 1996

[54] REFRIGERATION LUBRICANTS PREPARED BY POLYMERIZING ALKENE HAVING A PERFLUOROALKYL GROUP ON ONE END THEREOF

[75] Inventors: David Nalewajek, West Seneca; Richard E. Eibeck, Orchard Park; Raymond H. P. Thomas, Amherst, all of N.Y.

[73] Assignee: AlliedSignal Inc., Morris County, N.J.

[21] Appl. No.: 380,470

[22] Filed: Jan. 30, 1995

Related U.S. Application Data

[63] Continuation of Ser. No. 982,269, Nov. 25, 1992, abandoned, which is a continuation of Ser. No. 738,077, Jul. 30, 1991, abandoned.

[51] Int. Cl.$^6$ ................................................. C10M 107/38
[52] U.S. Cl. ............................................. 252/68; 508/590
[58] Field of Search .................................. 252/58, 67, 68, 252/54

[56] References Cited

U.S. PATENT DOCUMENTS

| | | | |
|---|---|---|---|
| 2,723,999 | 11/1955 | Cowen et al. | 260/615 |
| 3,483,129 | 12/1969 | Dolle et al. | 252/49.9 |
| 4,052,277 | 10/1977 | Martini et al. | 204/158 |
| 4,079,084 | 3/1978 | Houghton et al. | 260/615 |
| 4,118,398 | 10/1978 | Martini et al. | 260/340 |
| 4,267,064 | 5/1981 | Sasaki et al. | 252/52 |
| 4,359,394 | 11/1982 | Gainer et al. | 252/58 |
| 4,379,768 | 4/1983 | Yamabe et al. | 260/544 |
| 4,428,854 | 1/1984 | Enjo et al. | 252/69 |
| 4,431,557 | 2/1984 | Shimizu et al. | 252/52 |
| 4,443,349 | 4/1984 | Snyder, Jr. et al. | 252/49.9 |
| 4,675,452 | 6/1987 | Lagow et al. | 568/601 |
| 4,755,316 | 7/1988 | Magid et al. | 252/68 |
| 4,827,042 | 5/1989 | Lagow et al. | 568/603 |
| 4,898,991 | 2/1990 | Huang et al. | 568/615 |
| 4,931,199 | 6/1990 | Bierschenk et al. | 252/68 |
| 4,944,890 | 7/1990 | Deeb et al. | 252/58 |
| 4,948,525 | 8/1990 | Sasaki et al. | 252/52 |
| 4,975,212 | 12/1990 | Thomas et al. | 252/54 |
| 5,032,306 | 7/1991 | Cripps | 252/58 |

FOREIGN PATENT DOCUMENTS

| | | |
|---|---|---|
| 126094 | 3/1982 | Japan . |
| 288396 | 6/1987 | Japan . |
| 203695 | 5/1989 | Japan . |
| 277775 | 5/1989 | Japan . |
| 1087283 | 3/1966 | United Kingdom . |
| 4814671 | 10/1971 | United Kingdom . |
| 248054 | 10/1986 | WIPO . |
| 0245446 | 10/1986 | WIPO . |

OTHER PUBLICATIONS

Lubricants In Refrigerant Systems, 1980 Systems Handbook, Chapter 32 pp. 32.1–32.24. month unavailable.

R. C. Downing, Fluorocarbon Refrigerant Handbook pp. 13–14. Date Unknown.

H. H. Kruse & M. Schroeder, Fundamentals of Lubrication In Refrigerating Systems and Heat Pumps, pp. 763–783 Date Unknown.

H. O. Spauschus, Evaluation of Lubricants for Refrigeration and Air–Conditioning Compressors, pp. 14–19, Date Unknown.

K. S. Sanvordenker & M. W. Larime, A Review of Synthetic Oils for Refrigeration Use Date Unknown.

D. J. Carre, Perfluoropolyalkylether Lubricants Under Boundary Conditions: Iron Catalysis of Lubricant Degradation Date Unknown.

D. J. Carre, The Performance of Perfluoropolyalkylether Oils Under Boundary Lubrication Conditions, vol. 31. 4, pp. 437–441 Date Unknown.

Research Disclosure 17483, Oct. 1978.

*Primary Examiner*—Margaret Medley
*Attorney, Agent, or Firm*—Lois A. Gianneschi

[57] ABSTRACT

The present invention provides a composition for use in refrigeration and air-conditioning comprising: (a) at least one refrigerant selected from the group consisting of hydrofluorocarbon, hydrochlorofluorocarbon, fluorocarbon, and chlorofluorocarbon; and (b) a sufficient amount to provide lubrication of at least one lubricant prepared by polymerizing alkene having a perfluoroalkyl group on one end thereof. The lubricant has a molecular weight of about 300 to about 3,000 and a viscosity of about 5 to about 150 centistokes at 37° C. The lubricant is miscible in combination with the refrigerant in the range between about −40° C. and at least about +20° C.

2 Claims, No Drawings

REFRIGERATION LUBRICANTS PREPARED BY POLYMERIZING ALKENE HAVING A PERFLUOROALKYL GROUP ON ONE END THEREOF

This application is a continuation of application Ser. No. 07/982,269 filed Nov. 25, 1992 which is a continuation of application Ser. No. 07/738,077 filed Jul. 30, 1991, both applications which are now abandoned.

BACKGROUND OF THE INVENTION

The present invention relates to refrigeration lubricants prepared by polymerizing alkene having a perfluoroalkyl group on one end thereof. More particularly, the present invention relates to refrigeration lubricants for use with a hydrofluorocarbon, hydrochlorofluorocarbon, or fluorocarbon refrigerant and preferably, 1,1,1,2-tetrafluoroethane (known in the art as R134a). R134a is a refrigerant which may replace dichlorodifluoromethane (known in the art as R12) in many applications because environmental concerns over the use of R12 exist.

R134a has been mentioned as a possible replacement for R12 because concern over potential depletion of the ozone layer exists. R12 is used in closed loop refrigeration systems; many of these systems are automotive air-conditioning systems. R134a has properties similar to those of R12 so that it is possible to substitute R134a for R12 with minimal changes in equipment being required. The symmetrical isomer of R134a is R134 (1,1,2,2,-tetrafluoroethane); the isomer is also similar in properties and may also be used. Consequently, it should be understood that in the following discussion, "tetrafluoroethane" will refer to both R134 and R134a.

A unique problem arises in such a substitution. Refrigeration systems which use R-12 generally use mineral oils to lubricate the compressor; the present discussion does not apply to absorption refrigeration equipment. See for example the discussion in Chapter 32 of the 1980 ASHRAE Systems Handbook. R-12 is completely miscible with such oils throughout the entire range of refrigeration system temperatures which may range from about −45.6° to 65.6° C. Consequently, oil which dissolves in the refrigerant travels around the refrigerant to the compressor. The oil does not separate during condensation, although it may accumulate because low temperatures exist when the refrigerant is evaporated. At the same time, the oil which lubricates the compressor contains some refrigerant which may affect its lubricating property.

It is known in the industry that chlorodifluoromethane (known in the art as R22) and monochlorodifluoromethane/1-chloro-1,1,2,2,2-pentafluoroethane (known in the art as R502) are not completely miscible in common refrigeration oils. See Downing, FLUOROCARBONS REFRIGERANT HANDBOOK, p. 13. A solution to this problem has been the use of alkylated benzene oils. Such oils are immiscible in R134a and are not useful therewith. This problem is most severe at low temperatures when a separated oil layer would have a very high viscosity. Problems of oil returning to the compressor would be severe.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants presents problems, although no mention is made of R134a. These articles are Kruse et al., "Fundamentals of Lubrication in Refrigeration Systems and Heat Pumps," *ASHRAE TRANSACTIONS* 90(2B), 763 (1984) and Spauschus, "Evaluation of Lubricants for Refrigeration and Air-Conditioning Compressors," ibid, 784.

The following discussion will be more readily understood if the mutual solubility of refrigerants and various lubricating oils is considered in general with specific reference to R134a. Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and higher temperature, may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists and while it would be desirable that a refrigeration system operate within such a range, it has been found that for typical compositions, the miscible range of lubricants with R134a is not wide enough to encompass the typical refrigeration temperatures.

Some disclosures which are concerned with the choice of lubricants when R134a is used as a refrigerant exist. Polyalkylene glycols were suggested to be used in Research Disclosure 17483, October 1978 by DuPont. Specific reference was made to such oils produced by Union Carbide Corporation under the trade names "ULCON" (sic) LB-165 and UCON 525. It is stated that these oils are miscible in all proportions with R134a at temperatures at least as low as −50° C. It is believed that "ULCON" (sic) LB-165 and UCON 525 are polyoxypropylene glycols which have a hydroxy group at one end of each molecule and a n-butyl group at the other end.

The use of synthetic oils for refrigeration systems including polyoxyalkylene glycols is discussed by Sanvordenker et al. in a paper given at a ASHRAE Symposium, Jun. 29, 1972. The authors make the point that polyglycols should properly be called ethers and esters rather than glycols because the terminal hydroxyl groups are bound by ester or ether groups. It is stated that this substitution makes them suitable for lubrication.

U.S. Pat. No. 4,428,854 discloses the use of R134a as an absorption refrigerant where organic solvents are used as absorbing agents. An example is tetraethylene glycol dimethyl ether. A related patent U.S. Pat. No. 4,454,052 also discloses polyethylene glycol methyl ether used as an absorbent along with certain stabilizing materials for refrigerants such as 134a.

Japanese Patent Publication 96684 dated May 30, 1985 addresses the stability problems of refrigerants. The reference teaches that perfluoro ether oligomers are on class of useful lubrication oils.

U.S. Pat. No. 4,276,064 also recommends the use of polyglycol oils, particularly for rotary compressors. It is indicated that viscosities; in the range of 25–50 centistokes (CS) at 98.9° C. are needed plus a viscosity index greater than 150. Many refrigerants are mentioned but not tetrafluoroethane.

Japanese published application No. 51795 of 1982 relates to antioxidants and corrosion inhibitors for use with various polyether type synthetic oils. The tests were carried out with R-12, which does not exhibit the immiscible character of R134a.

Japanese published patent application 96,684 published May 30, 1985 addresses the stability problems of refrigerants. The reference mentions 12 refrigerants including perfluoro ether oligomer, fluorinated silicone, fluorinated oxethane, chlorotrifluoro ethylene polymer, fluorinated polyphenyl ether, and perfluoroamine.

U.S. Pat. No. 4,431,557 relates to additives used in synthetic oils. Many refrigerants are mentioned, but not tetrafluoroethane, and the patentees gave no indication of concern for miscibility of the refrigerants and the lubricants.

Commonly assigned U.S. Pat. No. 4,755,316 teaches a compression refrigeration composition. The refrigerant is tetrafluoroethane while the lubricant is at least one polyoxyalkylene glycol which is at least difunctional with respect to hydroxyl groups, has a molecular weight between 300 and 2,000, has a viscosity of about 25–150 centistokes at 37° C. has a viscosity index of at least 20, and is miscible in combination with the tetrafluoroethane in the range between −40° C. and at least +20° C. The reference does not teach or suggest the present refrigeration compositions. See also U.S. Pat. No. 4,948,525.

U.K. Patent 1,087,283; U.S. Pat. Nos. 3,483,129; 4,052,277; 4,118,398; 4,379,768; 4,443,349; 4,675,452; 4,827,042; 4,898,991; and 4,931,199; International Publications WO 87/02992 and WO 87/02993; and Kokai Patent Publication 118,598 published May 11, 1989 teach perfluorinated ethers and perfluoropolyethers as lubricants. The references do not teach that their lubricants are useful with R134a. Also, Kokai Patent Publication 146,996, published Jun. 30, 1987, teaches the addition of a perfluoroalkylpolyether as an extreme pressure additive to mineral oil.

Carre, "The Performance of Perfluoropolyalkyether Oils under Boundary Lubrication Conditions" *TRIBOLOGY TRANSACTIONS* 31(4), 437 (1987) and Carre, 1988 Air Force Report discuss the problems of perfluoropolyalkylethers and boundary lubrication in spacecraft.

U.K. Patent 1,354,138 teaches compounds of the formula:

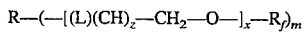

wherein L is —H or —CH$_3$ and z is 0, 1, or 2 on page 1, lines 9–41. As such, the oxyalkylene group can be oxymethylene when z is 0, ethylene oxide when z is 1 and L is —H, straight chain propylene oxide when z is 2 and L is —H, branched propylene oxide when z is 1 and L is —CH$_3$, and branched oxypentylene when z is 2 and L is —CH$_3$. These materials are taught to be useful as surfactants.

U.S. Pat. No. 4,079,084 teaches a compound having a chain of repeating units which may be oxyalkylidine, oxymethylene, oxyalkylene, imino alkylene, or secondary amido chains and at least two terminal perfluorocarbon groups of at least three carbon atoms. For the oxyalkylene unit, the reference teaches ethylene oxide, propylene oxide, or butylene oxide. These materials are taught to be useful as surfactants.

U.S. Pat. No. 2,723,999 teaches compounds of polyethylene glycols or polypropylene glycols. These materials are taught to be useful as surface active agents.

U.S. Pat. No. 4,359,394 teaches that a minor portion of an additive such as fluorinated aromatic, for example benzotrifluoride, can be added to a conventional lubricant such as mineral oil. The reference does not teach that a fluorinated aromatic alone is useful as a lubricant.

U.S. Pat. No. 4,994,890 claims a refrigeration composition wherein the lubricant is a polymer of R$_f$(CH$_2$)$_n$CH=CH$_2$ wherein R$_f$ is from CF$_3$— to C$_{20}$F$_{42}$— and n is 0 to 2.

Because it is expected that R134a will become widely used in the field of refrigeration and air-conditioning, new improved lubricants useful with R134a are needed in the art.

SUMMARY OF THE INVENTION

The present invention provides a composition for use in compression refrigeration comprising: (a) a saturated hydrocarbon having 1 to 4 carbon atoms that is partially or fully substituted with at least one atom of chlorine or fluorine and having a normal boiling point range in the range of −80° C. to +50° C. and (b) a sufficient amount to provide lubrication of a polymer of R$_f$(CH$_2$)$_n$CH=CH$_2$ wherein R$_f$ is from CF$_3$— to C$_{20}$F$_{41}$— and n is 0.

We found that lubricant compositions prepared by polymerizing alkene having a perfluoroalkyl group on one end thereof have improved miscibility with a refrigerant selected from the group consisting of hydrofluorocarbon, hydrochlorofluorocarbon, fluorocarbon, and chlorofluorocarbon. More particularly, the present lubricants are miscible with tetrafluoroethane. As such, the present invention provides a composition for use in compression refrigeration and air-conditioning comprising: (a) at least one refrigerant selected from the group consisting of hydrofluorocarbon, hydrochlorofluorocarbon, fluorocarbon, and chlorofluorocarbon; and (b) a sufficient amount to provide lubrication of at least one lubricant prepared by polymerizing alkene having a perfluoroalkyl group on one end thereof.

The lubricant has a molecular weight between about 300 and about 3,000 and a viscosity of about 5 to about 150 centistokes at 37° C. The lubricant is miscible in combination with the refrigerant in the range between −40° C. and at least 20° C. Preferably, the viscosity of the lubricant is about 35 to about 150 centistokes at 37° C.

The present invention also provides a composition for use in compression refrigeration and air-conditioning comprising: (a) at least one refrigerant selected from the group consisting of hydrofluorocarbon, hydrochlorofluorocarbon, fluorocarbon, and chlorofluorocarbon; and (b) a sufficient amount to provide lubrication of at least one lubricant prepared by copolymerizing an alkene having a perfluoroalkyl group on one end thereof with an alkene having an alkyl group on one end thereof wherein said copolymer lubricant has a molecular weight between about 300 and about 3,000, has a viscosity of about 5 to about 150 centistokes at 37° C., is miscible in combination with the refrigerant in the range between −40° C. and at least +20° C. and said perfluoroalkyl and alkyl groups are pendant groups on said copolymer backbone wherein of the total number of said pendant groups, at least 40% of said pendant groups are said perfluoroalkyl groups.

When used in combination with R134a, the present lubricating compositions provide improved ranges of miscibility. Comparable to the refrigerant lubricants of commonly assigned U.S. Pat. No. 4,975,212, the present lubricants when used with R134a have low upper critical solution temperatures (UCST) which are consistent over a range of viscosities taken at 37° C. Although the compositions of commonly assigned U.S. Pat. No. 4,975,212 exhibit wide miscibility ranges, it has been found that the present lubricants have higher lower critical solution temperatures (LCST), over a range of viscosities taken at 37° C., compared with the lubricants of commonly assigned U.S. Pat. No. 4,975,212. The term "higher lower critical solution temperatures" as used herein means the following. For the known lubricants of commonly assigned U.S. Pat. No. 4,975,212, assume that with a first fixed viscosity at 37° C., the miscibility range with R134a extends to a LCST of T1. In contrast with the present lubricants at the same viscosity, the miscibility range with R134a extends to a LCST of T2 wherein T2>T1. This unexpectedly superior property provides better operations at higher temperatures due to improved miscibility. Thus, the present lubricants when used with R134a are advantageous to use because they have wide miscibility ranges with consistent low UCSTs and higher LCSTs.

The present invention also provides a method for improving lubrication in refrigeration and air-conditioning equipment using a refrigerant selected from the group consisting of hydrofluorocarbon, hydrochlorofluorocarbon, fluorocarbon, and chlorofluorocarbon. The method comprises the step of: employing a sufficient amount to provide lubrication of at least one lubricant prepared by polymerizing alkene having perfluoroalkyl group on at least one end thereof. The lubricant has a molecular weight of about 300 to about 3,000 and a viscosity of about 5 to about 150 centistokes at 37° C. The partially fluorinated polyoxyalkylene glycol is miscible in combination with the refrigerant in the range between about −40° C. and at least about +20° C.

The present invention also provides a method for improving lubrication in refrigeration and air-conditioning equipment using a refrigerant selected from the group consisting of hydrofluorocarbon, hydrochlorofluorocarbon, fluorocarbon, and chlorofluorocarbon. The method comprises the step of: employing a sufficient amount to provide lubrication of at least one lubricant prepared by copolymerizing alkene having a perfluoroalkyl group on one end thereof with an alkene having an alkyl group on one end thereof. The lubricant has a molecular weight of about 300 to about 3,000, a viscosity of about 5 to about 150 centistokes at 37° C., is miscible in combination with the refrigerant in the range between about −40° C. and at least about 20° C., and said perfluoroalkyl and alkyl groups are pendant groups on the copolymer backbone wherein of the total number of the pendant groups, at least 40% of the pendant groups are perfluoroalkyl groups.

Other advantages of the present invention will become apparent from the following description and appended claims.

DETAILED DESCRIPTION OF THE PREFERRED EMBODIMENTS

Refrigerants

The present lubricating compositions may be used in most lubricating applications but they are particularly useful with tetrafluoroethane, and more particularly, R134a.

The invention relates to the substitution of tetrafluoroethane, and preferably, 1,1,1,2-tetrafluoroethane for R-12 which has been considered to present a danger to the atmospheric ozone layer. R134a has physical characteristics which allow its substitution for R-12 with only a minimum of equipment changes although it is more expensive and unavailable in large quantities at the present time. Its symmetrical isomer, R134, may also be used. The detrimental effect of tetrafluoroethane on atmospheric ozone is considered to be much less than the effect of R-12, and therefore, the substitution of tetrafluoroethane for R-12 is considered probable in the future.

Until R134a becomes available in commercial quantities, it may be produced by any known method including reacting ethylene with carbon having elemental fluorine adsorbed therein as taught by commonly assigned U.S. Pat. No. 4,937,398 which is incorporated herein by reference.

Preferably, the fluorocarbon or hydrofluorocarbon refrigerant is selected from those listed those listed in Table I below.

TABLE I

| Number | Chemical Name | Formula |
| --- | --- | --- |
| 23 | Trifluoromethane | $CHF_3$ |
| 32 | Difluoromethane | $CH_2F_2$ |
| 116 | Hexafluoroethane | $CF_3CF_3$ |
| 125 | Pentafluoroethane | $C_2HF_5$ |
| 134a | Tetrafluoroethane | $CF_3CFH_2$ |
| 143a | 1,1,1-Trifluoroethane | $CF_3CH_3$ |
| 152a | Difluoroethane | $CHF_2CH_3$ |
| C216 | Cycloperfluoropropane | $C_3F_6$ |
| C318 | Cycloperfluorobutane | $C_4F_8$ |

R-12 is used in very large quantities and of the total, a substantial fraction is used for automotive air-conditioning. Consequently, the investigation of the lubricants needed for use with R134a (or R134) has emphasized the requirements of automotive air-conditioning since the temperature range is generally higher than that of other refrigeration systems, i.e., about 0° C. to 93° C. Since it has been found that R134a differs in being much less miscible with common lubricants than R-12, the substitution of refrigerants becomes more difficult.

Lubricants

R-12 is fully miscible in ordinary mineral oils and consequently, separation of the lubricants is not a problem. Although it is similar to R12, R134a is relatively immiscible in many lubricants as may be seen by reference to commonly assigned U.S. Pat. No. 4,755,316. Thus, it is necessary to find suitable lubricants which are miscible with R134a (or R134) to avoid refrigerant and lubricant separation.

It is characteristic of some refrigerant-lubricant mixtures that a temperature exists above which the lubricant separates. Since this phenomenon occurs also at some low temperatures, a limited range of temperatures within which the two fluids are miscible may occur. Ideally, this range should span the operating temperature range in which the refrigerant is to operate, but often this is not possible. It is typical of automotive air-conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other air-conditioning system types usually circulate only the relatively smaller amount of lubricant which is carried by the refrigerant gas passing through the compressor and should be less sensitive to the separation problem. Especially with automotive air-conditioning, separation of the relatively large amount of lubricant circulating with the refrigerant can also affect the performance of other parts of the system.

In a typical automotive air-conditioning system, the temperatures at which the refrigerant is condensed originally will be about 50°–70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture, If lubricant separates at the condenser, then the performance of the evaporator stage can be affected if separate phases persist as the two-phase mixture passes through the pressure reduction step. As with the condenser, accumulation of lubricant on the evaporator coils can affect heat exchange efficiency. In addition the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

Preferably, the lubricating composition comprises the Formula (I):

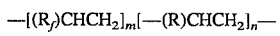

wherein R is selected from the group consisting of hydrogen and alkyl; m is 4 to 40; n is 0 to 40; and $R_f$ is a perfluoroalkyl group. Preferred alkyl groups for R have 1 to 12 carbon atoms and can be straight chain or branched. Examples of such alkyl groups include methyl, ethyl, n-propyl, isopropyl, n-butyl, sec-butyl, tert-butyl, n-pentyl, isopentyl, neopentyl, and the like. Preferably, R is alkyl.

Preferred perfluoroalkyl groups are of the Formula (III):

$C_nF_{2n+1}$ wherein n is 1 to 8 and include perfluoromethyl, perfluoroethyl, perfluoropropyl, perfluorobutyl, perfluoropentyl, perfluorohexyl, perfluoroheptyl, and perfluorooctyl.

As such, the present lubricating composition may be terminated by a hydrogen at one end and an alkyl group at the other end, by a hydrogen at one end and a fluorinated alkyl group at the other end, by an alkyl group at one end and a fluorinated alkyl group at the other end, by a hydrogen at both ends, by an alkyl group at both ends, or by a fluorinated alkyl group at both ends.

The most preferred lubricating compositions are where n is 0 or n=m. Thus, when n is 0, the most preferred lubricating compositions are:

and m≧4. When n equals m, the most preferred lubricating compositions are:

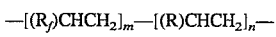

and m>4.

The lubricating compositions are formed by polymerizing alkene having a perfluoroalkyl group on at least one end thereof by the method described by Goldscmidt in the article entitled "The Polymerization of 3,3,3-trifluoropropene and 2-Methyl-3,3,3-trifluoropropene" as described in the *J. Amer. Chem. Soc.* 73, 2940 (1951).

Preferably, the novel lubricating compositions are prepared by reacting the alkene having a perfluoroalkyl group on at least one end thereof with free radical initiators. For example, commercially available 3,3,3-trifluoro-1-propene may be used as a starting material. The viscous oils are isolated directly from the reaction mixture. Viscosities of the final product are adjusted to the desired value by removing lower boiling oligomers by distillation.

The following alkenes having a perfluoroalkyl group on at least one end thereof are commercially available: $(C_2F_5)CHCH_2$; $(C_3F_7)CHCH_2$; $(C_4F_9)CHCH_2$; $(C_6F_{13})CHCH_2$; and $(C_8F_{17})CHCH_2$.

The present lubricants have higher low critical solution temperatures when used with R134a and consequently, they are an improvement on the compositions of tetrafluoroethane and fluorinated polyoxyalkylene glycols of U.S. Pat. No. 4,975,212. The present lubricants operate without separation from R134a over much of the operating temperature range. Any separation which does occur would preferably be at the higher temperatures, and thus, would affect the condenser rather than the lower temperature evaporator.

A blend of the present lubricating compositions wherein the compositions have different molecular weights may be used in practicing the present invention.

The present lubricating compositions are miscible in combination with tetrafluoroethane in the range between about −40° C. and at least about +20° C., preferably at least about +30° C., more preferably at least about +40° C., and most preferably at least about +50° C.

Preferably, the tetrafluoroethane and lubricant are used in a weight ratio of about 99:1 to about 1:99, and more preferably, in a weight ratio of about 99:1 to about 70:30.

The range of miscibility is not the only factor to be considered when one is selecting a lubricant for automotive air-conditioning service (or other refrigeration applications). Lubricating properties also must be satisfactory for the intended application. Practically, this means that for automotive air conditioning, the viscosity of the lubricant will be about 5–150 centistokes, preferably about 100 centistokes (CS) at 37° C. with a viscosity index of at least 20 in order that the lubricant is sufficiently viscous at high temperatures to lubricate while remaining sufficiently fluid to circulate around the refrigeration circuit at low temperatures. The range of viscosity may also be expressed as about 3–24 CS at 98.9° C. In addition, the lubricant should be chemically stable and not cause corrosion or other problems in long-term service. Other factors which should be considered in selecting lubricants are compatibility, lubricity, safety, and the like.

The present invention is more fully illustrated by the following non-limiting Examples.

COMPARATIVES A THROUGH E

Comparatives A through E demonstrate that perfluorinated ethers and perfluoropolyethers are not useful as lubricants with R134a because they are immiscible with R134a over a wide temperature range which is unsuitable for automotive air-conditioning purposes. Most automotive air-conditioners operate at about 0° to 93° C. Table II contains the results of the Comparatives. The viscosities are at 37° C.

and VISC stands for viscosity. MW stands for Molecular Weight. MISC stands for Miscibility in °C.

TABLE II

| COMP | ETHER | VISC | MW | ETHER % | MISC |
|---|---|---|---|---|---|
| A | Krytox 143AB ® | 85 | 3700 | 15 | Immiscible at and below 10.2 |
| B | Krytox 143AX ® | 150 | 4800 | 15 | Immiscible at and below 20.4 |
| C | Krytox 143CZ ® | 125 | 4400 | 15 | Immiscible at and below 19.6 |
| D | Brayco 1724 ® | 65.6 | — | 15 | Immiscible at and below 18.4 |
| E | S-100 ® | 100 | 4600 | 15 | Immiscible at and below 30 |

EXAMPLES 1–8

Examples 1 to 8 are directed towards the synthesis of the lubricating compositions as specified in this work.

EXAMPLE 1

This Example is directed to the preparation of poly(trifluoropropylene).

3,3,3-Trifluoropropene (25 grams) and t-butylperoxide (2.5 grams) in dimethylphthalate were heated in an autoclave at 95° C. for 96 hours. Unreacted monomer was removed from the reaction vessel. The contents of the autoclave were treated with sodium hydroxide to remove the dimethylphthalate. The resulting oil was vacuum distilled to yield 15 grams of a colorless product. The viscosity of this oil was 16 centistokes at 37.7° C.

EXAMPLE 2

The product of this reaction is the identical to that of Example 1, except that the viscosity was increased by distilling the lower boiling components from the product at 100° C. and 0.01 mm Hg. The viscosity of this product was 68 centistokes at 37.7° C.

EXAMPLE 3

The product of this reaction is identical to Example 1, except that the viscosity was increased by distilling a larger portion of the lower molecular weight oligomers. The viscosity of this product was 78 centistokes at 37.7° C.

EXAMPLE 4

The product of this reaction was prepared as described in Example 1 except a larger cut of the lower boiling oligomers was removed to increase the viscosity. The final viscosity of this product was 85 centistokes at 37.7° C.

EXAMPLE 5

The product of this reaction is prepared as described in Example 1 except the viscosity was adjusted to 150 centistokes at 37.7° C.

EXAMPLE 6

The co-polymer of the novel oils was prepared as described in Example 1. Both 3,3,3-trifluoropropene and propene were co-polymerized with t-butylperoxide. In a typical experiment, the molar ratio of trifluoropropene to propene was 1.5 to 1 which corresponds to an m value of 6 and an n value of 4 in Formula (I) above. The viscosity of this lubricant was 75 centistokes at 37.7° C.

EXAMPLE 7

The product of this reaction is produced as described in Example 6 except that the starting ratios of trifluoropropene to propene are 1 to 1.4 which corresponds to an m value of 4 and an n value of 6 in Formula (I) above. The viscosity of this lubricant was 8 centistokes at 37.7° C.

EXAMPLE 8

Example 8 is directed to the preparation of the co-polymer where the amount of trifluoromethyl groups is less than 40%. To prepare this material, the experimental procedure as described in Example 6 was used with the mole ratios of trifluoropropene to propene being 1 to 4. This produced an oil with an m value of 2 and an n value of 8 as described in Formula (I) above. This produced an oil with a viscosity of 40 centistokes at 37.7° C.

The miscibility of the lubricating compositions was determined by combining them with refrigerant in a glass tube and observing the results when the tubes were maintained at preselected temperatures. A tube was filled with the desired amount of lubricant and then refrigerant was added while the oil was frozen in liquid nitrogen. The tube was then sealed and immersed in a thermostated bath. After the temperature was equilibrated, the miscibility of the lubricant and refrigerant was determined by visual observation. The results of the tests made with R-134a and the lubricating compositions are shown in Table III below.

In Table III, MW stands for molecular weight, m and n are in Formula (I) above, VISC stands for viscosity at 37.7° C., and MISC stands for miscibility at the temperature range indicated. The amount of lubricant in R134a was 15 weight percent.

TABLE III

| EX | MW | m | n | VISC | MISC (°C.) |
|---|---|---|---|---|---|
| 1 | 380 | 4 | — | 16 | −60 to >90 |
| 2 | 700 | 7.3 | — | 68 | −60 to >90 |
| 3 | 750 | 7.8 | — | 78 | −60 to >90 |
| 4 | 800 | 8.3 | — | 85 | −60 to >90 |
| 5 | 1200 | 12.5 | — | 150 | −60 to >90 |
| 6 | 744 | 6 | 4 | 75 | −60 to >90 |
| 7 | 630 | 4 | 6 | 58 | −60 to >90 |
| 8 | 530 | 2 | 8 | 40 | −60 to 70 |

The new lubricating compositions have been shown to be completely miscible at low temperatures as well as the higher temperatures required for application as a refrigerant oil.

EXAMPLES 9 THROUGH 600

The lubricants of Examples 9 through 600 below are combined with tetrafluoroethane and the miscibility is determined as described for Examples 1 through 8 above.

| EX | LUBRICANT |
|---|---|
| 9 | —[(CF$_3$)CHCH$_2$]$_4$— |
| 10 | —[(CF$_3$)CHCH$_2$]$_5$— |
| 11 | —[(CF$_3$)CHCH$_2$]$_6$— |
| 12 | —[(CF$_3$)CHCH$_2$]$_7$— |
| 13 | —[(CF$_3$)CHCH$_2$]$_8$— |
| 14 | —[(CF$_3$)CHCH$_2$]$_9$— |

-continued

| EX | LUBRICANT |
|---|---|
| 15 | $-[(CF_3)CHCH_2]_{10}-$ |
| 16 | $-[(CF_3)CHCH_2]_{11}-$ |
| 17 | $-[(CF_3)CHCH_2]_{12}-$ |
| 18 | $-[(CF_3)CHCH_2]_{13}-$ |
| 19 | $-[(CF_3)CHCH_2]_{14}-$ |
| 20 | $-[(CF_3)CHCH_2]_{15}-$ |
| 21 | $-[(CF_3)CHCH_2]_{16}-$ |
| 22 | $-[(CF_3)CHCH_2]_{17}-$ |
| 23 | $-[(CF_3)CHCH_2]_{18}-$ |
| 24 | $-[(CF_3)CHCH_2]_{19}-$ |
| 25 | $-[(CF_3)CHCH_2]_{20}-$ |
| 26 | $-[(CF_3)CHCH_2]_{21}-$ |
| 27 | $-[(CF_3)CHCH_2]_{22}-$ |
| 28 | $-[(CF_3)CHCH_2]_{23}-$ |
| 29 | $-[(CF_3)CHCH_2]_{24}-$ |
| 30 | $-[(CF_3)CHCH_2]_{25}-$ |
| 31 | $-[(CF_3)CHCH_2]_{26}-$ |
| 32 | $-[(CF_3)CHCH_2]_{27}-$ |
| 33 | $-[(CF_3)CHCH_2]_{28}-$ |
| 34 | $-[(CF_3)CHCH_2]_{29}-$ |
| 35 | $-[(CF_3)CHCH_2]_{30}-$ |
| 36 | $-[(CF_3)CHCH_2]_{31}-$ |
| 37 | $-[(CF_3)CHCH_2]_{32}-$ |
| 38 | $-[(CF_3)CHCH_2]_{33}-$ |
| 39 | $-[(CF_3)CHCH_2]_{34}-$ |
| 40 | $-[(CF_3)CHCH_2]_{35}-$ |
| 41 | $-[(CF_3)CHCH_2]_{36}-$ |
| 42 | $-[(CF_3)CHCH_2]_{37}-$ |
| 43 | $-[(CF_3)CHCH_2]_{38}-$ |
| 44 | $-[(CF_3)CHCH_2]_{39}-$ |
| 45 | $-[(CF_3)CHCH_2]_{40}-$ |
| 46 | $-[(C_2F_5)CHCH_2]_4-$ |
| 47 | $-[(C_2F_5)CHCH_2]_5-$ |
| 48 | $-[(C_2F_5)CHCH_2]_6-$ |
| 49 | $-[(C_2F_5)CHCH_2]_7-$ |
| 50 | $-[(C_2F_5)CHCH_2]_8-$ |
| 51 | $-[(C_2F_5)CHCH_2]_9-$ |
| 52 | $-[(C_2F_5)CHCH_2]_{10}-$ |
| 53 | $-[(C_2F_5)CHCH_2]_{11}-$ |
| 54 | $-[(C_2F_5)CHCH_2]_{12}-$ |
| 55 | $-[(C_2F_5)CHCH_2]_{13}-$ |
| 56 | $-[(C_2F_5)CHCH_2]_{14}-$ |
| 57 | $-[(C_2F_5)CHCH_2]_{15}-$ |
| 58 | $-[(C_2F_5)CHCH_2]_{16}-$ |
| 59 | $-[(C_2F_5)CHCH_2]_{17}-$ |
| 60 | $-[(C_2F_5)CHCH_2]_{18}-$ |
| 61 | $-[(C_2F_5)CHCH_2]_{19}-$ |
| 62 | $-[(C_2F_5)CHCH_2]_{20}-$ |
| 63 | $-[(C_2F_5)CHCH_2]_{21}-$ |
| 64 | $-[(C_2F_5)CHCH_2]_{22}-$ |
| 65 | $-[(C_2F_5)CHCH_2]_{23}-$ |
| 66 | $-[(C_2F_5)CHCH_2]_{24}-$ |
| 67 | $-[(C_2F_5)CHCH_2]_{25}-$ |
| 68 | $-[(C_2F_5)CHCH_2]_{26}-$ |
| 69 | $-[(C_2F_5)CHCH_2]_{27}-$ |
| 70 | $-[(C_2F_5)CHCH_2]_{28}-$ |
| 71 | $-[(C_2F_5)CHCH_2]_{29}-$ |
| 72 | $-[(C_2F_5)CHCH_2]_{30}-$ |
| 73 | $-[(C_2F_5)CHCH_2]_{31}-$ |
| 74 | $-[(C_2F_5)CHCH_2]_{32}-$ |
| 75 | $-[(C_2F_5)CHCH_2]_{33}-$ |
| 76 | $-[(C_2F_5)CHCH_2]_{34}-$ |
| 77 | $-[(C_2F_5)CHCH_2]_{35}-$ |
| 78 | $-[(C_2F_5)CHCH_2]_{36}-$ |
| 79 | $-[(C_2F_5)CHCH_2]_{37}-$ |
| 80 | $-[(C_2F_5)CHCH_2]_{38}-$ |
| 81 | $-[(C_2F_5)CHCH_2]_{39}-$ |
| 82 | $-[(C_2F_5)CHCH_2]_{40}-$ |
| 83 | $-[(C_3F_7)CHCH_2]_4-$ |
| 84 | $-[(C_3F_7)CHCH_2]_5-$ |
| 85 | $-[(C_3F_7)CHCH_2]_6-$ |
| 86 | $-[(C_3F_7)CHCH_2]_7-$ |
| 87 | $-[(C_3F_7)CHCH_2]_8-$ |
| 88 | $-[(C_3F_7)CHCH_2]_9-$ |
| 89 | $-[(C_3F_7)CHCH_2]_{10}-$ |
| 90 | $-[(C_3F_7)CHCH_2]_{11}-$ |
| 91 | $-[(C_3F_7)CHCH_2]_{12}-$ |
| 92 | $-[(C_3F_7)CHCH_2]_{13}-$ |

-continued

| EX | LUBRICANT |
|---|---|
| 93 | $-[(C_3F_7)CHCH_2]_{14}-$ |
| 94 | $-[(C_3F_7)CHCH_2]_{15}-$ |
| 95 | $-[(C_3F_7)CHCH_2]_{16}-$ |
| 96 | $-[(C_3F_7)CHCH_2]_{17}-$ |
| 97 | $-[(C_3F_7)CHCH_2]_{18}-$ |
| 98 | $-[(C_3F_7)CHCH_2]_{19}-$ |
| 99 | $-[(C_3F_7)CHCH_2]_{20}-$ |
| 100 | $-[(C_3F_7)CHCH_2]_{21}-$ |
| 101 | $-[(C_3F_7)CHCH_2]_{22}-$ |
| 102 | $-[(C_3F_7)CHCH_2]_{23}-$ |
| 103 | $-[(C_3F_7)CHCH_2]_{24}-$ |
| 104 | $-[(C_3F_7)CHCH_2]_{25}-$ |
| 105 | $-[(C_3F_7)CHCH_2]_{26}-$ |
| 106 | $-[(C_3F_7)CHCH_2]_{27}-$ |
| 107 | $-[(C_3F_7)CHCH_2]_{28}-$ |
| 108 | $-[(C_3F_7)CHCH_2]_{29}-$ |
| 109 | $-[(C_3F_7)CHCH_2]_{30}-$ |
| 110 | $-[(C_3F_7)CHCH_2]_{31}-$ |
| 111 | $-[(C_3F_7)CHCH_2]_{32}-$ |
| 112 | $-[(C_3F_7)CHCH_2]_{33}-$ |
| 113 | $-[(C_3F_7)CHCH_2]_{34}-$ |
| 114 | $-[(C_3F_7)CHCH_2]_{35}-$ |
| 115 | $-[(C_3F_7)CHCH_2]_{36}-$ |
| 116 | $-[(C_3F_7)CHCH_2]_{37}-$ |
| 117 | $-[(C_3F_7)CHCH_2]_{38}-$ |
| 118 | $-[(C_3F_7)CHCH_2]_{39}-$ |
| 119 | $-[(C_3F_7)CHCH_2]_{40}-$ |
| 120 | $-[(C_4F_9)CHCH_2]_4-$ |
| 121 | $-[(C_4F_9)CHCH_2]_5-$ |
| 122 | $-[(C_4F_9)CHCH_2]_6-$ |
| 123 | $-[(C_4F_9)CHCH_2]_7-$ |
| 124 | $-[(C_4F_9)CHCH_2]_8-$ |
| 125 | $-[(C_4F_9)CHCH_2]_9-$ |
| 126 | $-[(C_4F_9)CHCH_2]_{10}-$ |
| 127 | $-[(C_4F_9)CHCH_2]_{11}-$ |
| 128 | $-[(C_4F_9)CHCH_2]_{12}-$ |
| 129 | $-[(C_4F_9)CHCH_2]_{13}-$ |
| 130 | $-[(C_4F_9)CHCH_2]_{14}-$ |
| 131 | $-[(C_4F_9)CHCH_2]_{15}-$ |
| 132 | $-[(C_4F_9)CHCH_2]_{16}-$ |
| 133 | $-[(C_4F_9)CHCH_2]_{17}-$ |
| 134 | $-[(C_4F_9)CHCH_2]_{18}-$ |
| 135 | $-[(C_4F_9)CHCH_2]_{19}-$ |
| 136 | $-[(C_4F_9)CHCH_2]_{20}-$ |
| 137 | $-[(C_4F_9)CHCH_2]_{21}-$ |
| 138 | $-[(C_4F_9)CHCH_2]_{22}-$ |
| 139 | $-[(C_4F_9)CHCH_2]_{23}-$ |
| 140 | $-[(C_4F_9)CHCH_2]_{24}-$ |
| 141 | $-[(C_4F_9)CHCH_2]_{25}-$ |
| 142 | $-[(C_4F_9)CHCH_2]_{26}-$ |
| 143 | $-[(C_4F_9)CHCH_2]_{27}-$ |
| 144 | $-[(C_4F_9)CHCH_2]_{28}-$ |
| 145 | $-[(C_4F_9)CHCH_2]_{29}-$ |
| 146 | $-[(C_4F_9)CHCH_2]_{30}-$ |
| 147 | $-[(C_4F_9)CHCH_2]_{31}-$ |
| 148 | $-[(C_4F_9)CHCH_2]_{32}-$ |
| 149 | $-[(C_4F_9)CHCH_2]_{33}-$ |
| 150 | $-[(C_4F_9)CHCH_2]_{34}-$ |
| 151 | $-[(C_4F_9)CHCH_2]_{35}-$ |
| 152 | $-[(C_4F_9)CHCH_2]_{36}-$ |
| 153 | $-[(C_4F_9)CHCH_2]_{37}-$ |
| 154 | $-[(C_4F_9)CHCH_2]_{38}-$ |
| 155 | $-[(C_4F_9)CHCH_2]_{39}-$ |
| 156 | $-[(C_4F_9)CHCH_2]_{40}-$ |
| 157 | $-[(C_5F_{11})CHCH_2]_4-$ |
| 158 | $-[(C_5F_{11})CHCH_2]_5-$ |
| 159 | $-[(C_5F_{11})CHCH_2]_6-$ |
| 160 | $-[(C_5F_{11})CHCH_2]_7-$ |
| 161 | $-[(C_5F_{11})CHCH_2]_8-$ |
| 162 | $-[(C_5F_{11})CHCH_2]_9-$ |
| 163 | $-[(C_5F_{11})CHCH_2]_{10}-$ |
| 164 | $-[(C_5F_{11})CHCH_2]_{11}-$ |
| 165 | $-[(C_5F_{11})CHCH_2]_{12}-$ |
| 166 | $-[(C_5F_{11})CHCH_2]_{13}-$ |
| 167 | $-[(C_5F_{11})CHCH_2]_{14}-$ |
| 168 | $-[(C_5F_{11})CHCH_2]_{15}-$ |
| 169 | $-[(C_5F_{11})CHCH_2]_{16}-$ |
| 170 | $-[(C_5F_{11})CHCH_2]_{17}-$ |

| EX | LUBRICANT |
|---|---|
| 171 | $-[(C_5F_{11})CHCH_2]_{18}-$ |
| 172 | $-[(C_5F_{11})CHCH_2]_{19}-$ |
| 173 | $-[(C_5F_{11})CHCH_2]_{20}-$ |
| 174 | $-[(C_5F_{11})CHCH_2]_{21}-$ |
| 175 | $-[(C_5F_{11})CHCH_2]_{22}-$ |
| 176 | $-[(C_5F_{11})CHCH_2]_{23}-$ |
| 177 | $-[(C_5F_{11})CHCH_2]_{24}-$ |
| 178 | $-[(C_5F_{11})CHCH_2]_{25}-$ |
| 179 | $-[(C_5F_{11})CHCH_2]_{26}-$ |
| 180 | $-[(C_5F_{11})CHCH_2]_{27}-$ |
| 181 | $-[(C_5F_{11})CHCH_2]_{28}-$ |
| 182 | $-[(C_5F_{11})CHCH_2]_{29}-$ |
| 183 | $-[(C_5F_{11})CHCH_2]_{30}-$ |
| 184 | $-[(C_5F_{11})CHCH_2]_{31}-$ |
| 185 | $-[(C_5F_{11})CHCH_2]_{32}-$ |
| 186 | $-[(C_5F_{11})CHCH_2]_{33}-$ |
| 187 | $-[(C_5F_{11})CHCH_2]_{34}-$ |
| 188 | $-[(C_5F_{11})CHCH_2]_{35}-$ |
| 189 | $-[(C_5F_{11})CHCH_2]_{36}-$ |
| 190 | $-[(C_5F_{11})CHCH_2]_{37}-$ |
| 191 | $-[(C_5F_{11})CHCH_2]_{38}-$ |
| 192 | $-[(C_5F_{11})CHCH_2]_{39}-$ |
| 193 | $-[(C_5F_{11})CHCH_2]_{40}-$ |
| 194 | $-[(C_6F_{13})CHCH_2]_4-$ |
| 195 | $-[(C_6F_{13})CHCH_2]_5-$ |
| 196 | $-[(C_6F_{13})CHCH_2]_6-$ |
| 197 | $-[(C_6F_{13})CHCH_2]_7-$ |
| 198 | $-[(C_6F_{13})CHCH_2]_8-$ |
| 199 | $-[(C_6F_{13})CHCH_2]_9-$ |
| 200 | $-[(C_6F_{13})CHCH_2]_{10}-$ |
| 201 | $-[(C_6F_{13})CHCH_2]_{11}-$ |
| 202 | $-[(C_6F_{13})CHCH_2]_{12}-$ |
| 203 | $-[(C_6F_{13})CHCH_2]_{13}-$ |
| 204 | $-[(C_6F_{13})CHCH_2]_{14}-$ |
| 205 | $-[(C_6F_{13})CHCH_2]_{15}-$ |
| 206 | $-[(C_6F_{13})CHCH_2]_{16}-$ |
| 207 | $-[(C_6F_{13})CHCH_2]_{17}-$ |
| 208 | $-[(C_6F_{13})CHCH_2]_{18}-$ |
| 209 | $-[(C_6F_{13})CHCH_2]_{19}-$ |
| 210 | $-[(C_6F_{13})CHCH_2]_{20}-$ |
| 211 | $-[(C_6F_{13})CHCH_2]_{21}-$ |
| 212 | $-[(C_6F_{13})CHCH_2]_{22}-$ |
| 213 | $-[(C_6F_{13})CHCH_2]_{23}-$ |
| 214 | $-[(C_6F_{13})CHCH_2]_{24}-$ |
| 215 | $-[(C_6F_{13})CHCH_2]_{25}-$ |
| 216 | $-[(C_6F_{13})CHCH_2]_{26}-$ |
| 217 | $-[(C_6F_{13})CHCH_2]_{27}-$ |
| 218 | $-[(C_6F_{13})CHCH_2]_{28}-$ |
| 219 | $-[(C_6F_{13})CHCH_2]_{29}-$ |
| 220 | $-[(C_6F_{13})CHCH_2]_{30}-$ |
| 221 | $-[(C_6F_{13})CHCH_2]_{31}-$ |
| 222 | $-[(C_6F_{13})CHCH_2]_{32}-$ |
| 223 | $-[(C_6F_{13})CHCH_2]_{33}-$ |
| 224 | $-[(C_6F_{13})CHCH_2]_{34}-$ |
| 225 | $-[(C_6F_{13})CHCH_2]_{35}-$ |
| 226 | $-[(C_6F_{13})CHCH_2]_{36}-$ |
| 227 | $-[(C_6F_{13})CHCH_2]_{37}-$ |
| 228 | $-[(C_6F_{13})CHCH_2]_{38}-$ |
| 229 | $-[(C_6F_{13})CHCH_2]_{39}-$ |
| 230 | $-[(C_6F_{13})CHCH_2]_{40}-$ |
| 231 | $-[(C_7F_{15})CHCH_2]_4-$ |
| 232 | $-[(C_7F_{15})CHCH_2]_5-$ |
| 233 | $-[(C_7F_{15})CHCH_2]_6-$ |
| 234 | $-[(C_7F_{15})CHCH_2]_7-$ |
| 235 | $-[(C_7F_{15})CHCH_2]_8-$ |
| 236 | $-[(C_7F_{15})CHCH_2]_9-$ |
| 237 | $-[(C_7F_{15})CHCH_2]_{10}-$ |
| 238 | $-[(C_7F_{15})CHCH_2]_{11}-$ |
| 239 | $-[(C_7F_{15})CHCH_2]_{12}-$ |
| 240 | $-[(C_7F_{15})CHCH_2]_{13}-$ |
| 241 | $-[(C_7F_{15})CHCH_2]_{14}-$ |
| 242 | $-[(C_7F_{15})CHCH_2]_{15}-$ |
| 243 | $-[(C_7F_{15})CHCH_2]_{16}-$ |
| 244 | $-[(C_7F_{15})CHCH_2]_{17}-$ |
| 245 | $-[(C_7F_{15})CHCH_2]_{18}-$ |
| 246 | $-[(C_7F_{15})CHCH_2]_{19}-$ |
| 247 | $-[(C_7F_{15})CHCH_2]_{20}-$ |
| 248 | $-[(C_7F_{15})CHCH_2]_{21}-$ |
| 249 | $-[(C_7F_{15})CHCH_2]_{22}-$ |
| 250 | $-[(C_7F_{15})CHCH_2]_{23}-$ |
| 251 | $-[(C_7F_{15})CHCH_2]_{24}-$ |
| 252 | $-[(C_7F_{15})CHCH_2]_{25}-$ |
| 253 | $-[(C_7F_{15})CHCH_2]_{26}-$ |
| 254 | $-[(C_7F_{15})CHCH_2]_{27}-$ |
| 255 | $-[(C_7F_{15})CHCH_2]_{28}-$ |
| 256 | $-[(C_7F_{15})CHCH_2]_{29}-$ |
| 257 | $-[(C_7F_{15})CHCH_2]_{30}-$ |
| 258 | $-[(C_7F_{15})CHCH_2]_{31}-$ |
| 259 | $-[(C_7F_{15})CHCH_2]_{32}-$ |
| 260 | $-[(C_7F_{15})CHCH_2]_{33}-$ |
| 261 | $-[(C_7F_{15})CHCH_2]_{34}-$ |
| 262 | $-[(C_7F_{15})CHCH_2]_{35}-$ |
| 263 | $-[(C_7F_{15})CHCH_2]_{36}-$ |
| 264 | $-[(C_7F_{15})CHCH_2]_{37}-$ |
| 265 | $-[(C_7F_{15})CHCH_2]_{38}-$ |
| 266 | $-[(C_7F_{15})CHCH_2]_{39}-$ |
| 267 | $-[(C_7F_{15})CHCH_2]_{40}-$ |
| 268 | $-[(C_8F_{15})CHCH_2]_4-$ |
| 269 | $-[(C_8F_{15})CHCH_2]_5-$ |
| 270 | $-[(C_8F_{17})CHCH_2]_6-$ |
| 271 | $-[(C_8F_{17})CHCH_2]_7-$ |
| 272 | $-[(C_8F_{17})CHCH_2]_8-$ |
| 273 | $-[(C_8F_{17})CHCH_2]_9-$ |
| 274 | $-[(C_8F_{17})CHCH_2]_{10}-$ |
| 275 | $-[(C_8F_{17})CHCH_2]_{11}-$ |
| 276 | $-[(C_8F_{17})CHCH_2]_{12}-$ |
| 277 | $-[(C_8F_{17})CHCH_2]_{13}-$ |
| 278 | $-[(C_8F_{17})CHCH_2]_{14}-$ |
| 279 | $-[(C_8F_{17})CHCH_2]_{15}-$ |
| 280 | $-[(C_8F_{17})CHCH_2]_{16}-$ |
| 281 | $-[(C_8F_{17})CHCH_2]_{17}-$ |
| 282 | $-[(C_8F_{17})CHCH_2]_{18}-$ |
| 283 | $-[(C_8F_{17})CHCH_2]_{19}-$ |
| 284 | $-[(C_8F_{17})CHCH_2]_{20}-$ |
| 285 | $-[(C_8F_{17})CHCH_2]_{21}-$ |
| 286 | $-[(C_8F_{17})CHCH_2]_{22}-$ |
| 287 | $-[(C_8F_{17})CHCH_2]_{23}-$ |
| 288 | $-[(C_8F_{17})CHCH_2]_{24}-$ |
| 289 | $-[(C_8F_{17})CHCH_2]_{25}-$ |
| 290 | $-[(C_8F_{17})CHCH_2]_{26}-$ |
| 291 | $-[(C_8F_{17})CHCH_2]_{27}-$ |
| 292 | $-[(C_8F_{17})CHCH_2]_{28}-$ |
| 293 | $-[(C_8F_{17})CHCH_2]_{29}-$ |
| 294 | $-[(C_8F_{17})CHCH_2]_{30}-$ |
| 295 | $-[(C_8F_{17})CHCH_2]_{31}-$ |
| 296 | $-[(C_8F_{17})CHCH_2]_{32}-$ |
| 297 | $-[(C_8F_{17})CHCH_2]_{33}-$ |
| 298 | $-[(C_8F_{17})CHCH_2]_{34}-$ |
| 299 | $-[(C_8F_{17})CHCH_2]_{35}-$ |
| 300 | $-[(C_8F_{17})CHCH_2]_{36}-$ |
| 301 | $-[(C_8F_{17})CHCH_2]_{37}-$ |
| 302 | $-[(C_8F_{17})CHCH_2]_{38}-$ |
| 303 | $-[(C_8F_{17})CHCH_2]_{39}-$ |
| 304 | $-[(C_8F_{17})CHCH_2]_{40}-$ |
| 305 | $-[(CF_3)CHCH_2]_4-[(CH_3)CHCH_2]_4-$ |
| 306 | $-[(CF_3)CHCH_2]_5-[(CH_3)CHCH_2]_5-$ |
| 307 | $-[(CF_3)CHCH_2]_6-[(CH_3)CHCH_2]_6-$ |
| 308 | $-[(CF_3)CHCH_2]_7-[(CH_3)CHCH_2]_7-$ |
| 309 | $-[(CF_3)CHCH_2]_8-[(CH_3)CHCH_2]_8-$ |
| 310 | $-[(CF_3)CHCH_2]_9-[(CH_3)CHCH_2]_9-$ |
| 311 | $-[(CF_3)CHCH_2]_{10}-[(CH_3)CHCH_2]_{10}-$ |
| 312 | $-[(CF_3)CHCH_2]_{11}-[(CH_3)CHCH_2]_{11}-$ |
| 313 | $-[(CF_3)CHCH_2]_{12}-[(CH_3)CHCH_2]_{12}-$ |
| 314 | $-[(CF_3)CHCH_2]_{13}-[(CH_3)CHCH_2]_{13}-$ |
| 315 | $-[(CF_3)CHCH_2]_{14}-[(CH_3)CHCH_2]_{14}-$ |
| 316 | $-[(CF_3)CHCH_2]_{15}-[(CH_3)CHCH_2]_{15}-$ |
| 317 | $-[(CF_3)CHCH_2]_{16}-[(CH_3)CHCH_2]_{16}-$ |
| 318 | $-[(CF_3)CHCH_2]_{17}-[(CH_3)CHCH_2]_{17}-$ |
| 319 | $-[(CF_3)CHCH_2]_{18}-[(CH_3)CHCH_2]_{18}-$ |
| 320 | $-[(CF_3)CHCH_2]_{19}-[(CH_3)CHCH_2]_{19}-$ |
| 321 | $-[(CF_3)CHCH_2]_{20}-[(CH_3)CHCH_2]_{20}-$ |
| 322 | $-[(CF_3)CHCH_2]_{21}-[(CH_3)CHCH_2]_{21}-$ |
| 323 | $-[(CF_3)CHCH_2]_{22}-[(CH_3)CHCH_2]_{22}-$ |
| 324 | $-[(CF_3)CHCH_2]_{23}-[(CH_3)CHCH_2]_{23}-$ |
| 325 | $-[(CF_3)CHCH_2]_{24}-[(CH_3)CHCH_2]_{24}-$ |
| 326 | $-[(CF_3)CHCH_2]_{25}-[(CH_3)CHCH_2]_{25}-$ |

| EX | LUBRICANT |
|---|---|
| 327 | —[(CF$_3$)CHCH$_2$]$_{26}$—[(CH$_3$)CHCH$_2$]$_{26}$— |
| 328 | —[(CF$_3$)CHCH$_2$]$_{27}$—[(CH$_3$)CHCH$_2$]$_{27}$— |
| 329 | —[(CF$_3$)CHCH$_2$]$_{28}$—[(CH$_3$)CHCH$_2$]$_{28}$— |
| 330 | —[(CF$_3$)CHCH$_2$]$_{29}$—[(CH$_3$)CHCH$_2$]$_{29}$— |
| 331 | —[(CF$_3$)CHCH$_2$]$_{30}$—[(CH$_3$)CHCH$_2$]$_{30}$— |
| 332 | —[(CF$_3$)CHCH$_2$]$_{31}$—[(CH$_3$)CHCH$_2$]$_{31}$— |
| 333 | —[(CF$_3$)CHCH$_2$]$_{32}$—[(CH$_3$)CHCH$_2$]$_{32}$— |
| 334 | —[(CF$_3$)CHCH$_2$]$_{33}$—[(CH$_3$)CHCH$_2$]$_{33}$— |
| 335 | —[(CF$_3$)CHCH$_2$]$_{34}$—[(CH$_3$)CHCH$_2$]$_{34}$— |
| 336 | —[(CF$_3$)CHCH$_2$]$_{35}$—[(CH$_3$)CHCH$_2$]$_{35}$— |
| 337 | —[(CF$_3$)CHCH$_2$]$_{36}$—[(CH$_3$)CHCH$_2$]$_{36}$— |
| 338 | —[(CF$_3$)CHCH$_2$]$_{37}$—[(CH$_3$)CHCH$_2$]$_{37}$— |
| 339 | —[(CF$_3$)CHCH$_2$]$_{38}$—[(CH$_3$)CHCH$_2$]$_{38}$— |
| 340 | —[(CF$_3$)CHCH$_2$]$_{39}$—[(CH$_3$)CHCH$_2$]$_{39}$— |
| 341 | —[(CF$_3$)CHCH$_2$]$_{40}$—[(CH$_3$)CHCH$_2$]$_{40}$— |
| 342 | —[(C$_2$F$_5$)CHCH$_2$]$_{4}$—[(CH$_3$)CHCH$_2$]$_{4}$— |
| 343 | —[(C$_2$F$_5$)CHCH$_2$]$_{5}$—[(CH$_3$)CHCH$_2$]$_{5}$— |
| 344 | —[(C$_2$F$_5$)CHCH$_2$]$_{6}$—[(CH$_3$)CHCH$_2$]$_{6}$— |
| 345 | —[(C$_2$F$_5$)CHCH$_2$]$_{7}$—[(CH$_3$)CHCH$_2$]$_{7}$— |
| 346 | —[(C$_2$F$_5$)CHCH$_2$]$_{8}$—[(CH$_3$)CHCH$_2$]$_{8}$— |
| 347 | —[(C$_2$F$_5$)CHCH$_2$]$_{9}$—[(CH$_3$)CHCH$_2$]$_{9}$— |
| 348 | —[(C$_2$F$_5$)CHCH$_2$]$_{10}$—[(CH$_3$)CHCH$_2$]$_{10}$— |
| 349 | —[(C$_2$F$_5$)CHCH$_2$]$_{11}$—[(CH$_3$)CHCH$_2$]$_{11}$— |
| 350 | —[(C$_2$F$_5$)CHCH$_2$]$_{12}$—[(CH$_3$)CHCH$_2$]$_{12}$— |
| 351 | —[(C$_2$F$_5$)CHCH$_2$]$_{13}$—[(CH$_3$)CHCH$_2$]$_{13}$— |
| 352 | —[(C$_2$F$_5$)CHCH$_2$]$_{14}$—[(CH$_3$)CHCH$_2$]$_{14}$— |
| 353 | —[(C$_2$F$_5$)CHCH$_2$]$_{15}$—[(CH$_3$)CHCH$_2$]$_{15}$— |
| 354 | —[(C$_2$F$_5$)CHCH$_2$]$_{16}$—[(CH$_3$)CHCH$_2$]$_{16}$— |
| 355 | —[(C$_2$F$_5$)CHCH$_2$]$_{17}$—[(CH$_3$)CHCH$_2$]$_{17}$— |
| 356 | —[(C$_2$F$_5$)CHCH$_2$]$_{18}$—[(CH$_3$)CHCH$_2$]$_{18}$— |
| 357 | —[(C$_2$F$_5$)CHCH$_2$]$_{19}$—[(CH$_3$)CHCH$_2$]$_{19}$— |
| 358 | —[(C$_2$F$_5$)CHCH$_2$]$_{20}$—[(CH$_3$)CHCH$_2$]$_{20}$— |
| 359 | —[(C$_2$F$_5$)CHCH$_2$]$_{21}$—[(CH$_3$)CHCH$_2$]$_{21}$— |
| 360 | —[(C$_2$F$_5$)CHCH$_2$]$_{22}$—[(CH$_3$)CHCH$_2$]$_{22}$— |
| 361 | —[(C$_2$F$_5$)CHCH$_2$]$_{23}$—[(CH$_3$)CHCH$_2$]$_{23}$— |
| 362 | —[(C$_2$F$_5$)CHCH$_2$]$_{24}$—[(CH$_3$)CHCH$_2$]$_{24}$— |
| 363 | —[(C$_2$F$_5$)CHCH$_2$]$_{25}$—[(CH$_3$)CHCH$_2$]$_{25}$— |
| 364 | —[(C$_2$F$_5$)CHCH$_2$]$_{26}$—[(CH$_3$)CHCH$_2$]$_{26}$— |
| 365 | —[(C$_2$F$_5$)CHCH$_2$]$_{27}$—[(CH$_3$)CHCH$_2$]$_{27}$— |
| 366 | —[(C$_2$F$_5$)CHCH$_2$]$_{28}$—[(CH$_3$)CHCH$_2$]$_{28}$— |
| 367 | —[(C$_2$F$_5$)CHCH$_2$]$_{29}$—[(CH$_3$)CHCH$_2$]$_{29}$— |
| 368 | —[(C$_2$F$_5$)CHCH$_2$]$_{30}$—[(CH$_3$)CHCH$_2$]$_{30}$— |
| 369 | —[(C$_2$F$_5$)CHCH$_2$]$_{31}$—[(CH$_3$)CHCH$_2$]$_{31}$— |
| 370 | —[(C$_2$F$_5$)CHCH$_2$]$_{32}$—[(CH$_3$)CHCH$_2$]$_{32}$— |
| 371 | —[(C$_2$F$_5$)CHCH$_2$]$_{33}$—[(CH$_3$)CHCH$_2$]$_{33}$— |
| 372 | —[(C$_2$F$_5$)CHCH$_2$]$_{34}$—[(CH$_3$)CHCH$_2$]$_{34}$— |
| 373 | —[(C$_2$F$_5$)CHCH$_2$]$_{35}$—[(CH$_3$)CHCH$_2$]$_{35}$— |
| 374 | —[(C$_2$F$_5$)CHCH$_2$]$_{36}$—[(CH$_3$)CHCH$_2$]$_{36}$— |
| 375 | —[(C$_2$F$_5$)CHCH$_2$]$_{37}$—[(CH$_3$)CHCH$_2$]$_{37}$— |
| 376 | —[(C$_2$F$_5$)CHCH$_2$]$_{38}$—[(CH$_3$)CHCH$_2$]$_{38}$— |
| 377 | —[(C$_2$F$_5$)CHCH$_2$]$_{39}$—[(CH$_3$)CHCH$_2$]$_{39}$— |
| 378 | —[(C$_2$F$_5$)CHCH$_2$]$_{40}$—[(CH$_3$)CHCH$_2$]$_{40}$— |
| 379 | —[(C$_3$F$_7$)CHCH$_2$]$_{4}$—[(CH$_3$)CHCH$_2$]$_{4}$— |
| 380 | —[(C$_3$F$_7$)CHCH$_2$]$_{5}$—[(CH$_3$)CHCH$_2$]$_{5}$— |
| 381 | —[(C$_3$F$_7$)CHCH$_2$]$_{6}$—[(CH$_3$)CHCH$_2$]$_{6}$— |
| 382 | —[(C$_3$F$_7$)CHCH$_2$]$_{7}$—[(CH$_3$)CHCH$_2$]$_{7}$— |
| 383 | —[(C$_3$F$_7$)CHCH$_2$]$_{8}$—[(CH$_3$)CHCH$_2$]$_{8}$— |
| 384 | —[(C$_3$F$_7$)CHCH$_2$]$_{9}$—[(CH$_3$)CHCH$_2$]$_{9}$— |
| 385 | —[(C$_3$F$_7$)CHCH$_2$]$_{10}$—[(CH$_3$)CHCH$_2$]$_{10}$— |
| 386 | —[(C$_3$F$_7$)CHCH$_2$]$_{11}$—[(CH$_3$)CHCH$_2$]$_{11}$— |
| 387 | —[(C$_3$F$_7$)CHCH$_2$]$_{12}$—[(CH$_3$)CHCH$_2$]$_{12}$— |
| 388 | —[(C$_3$F$_7$)CHCH$_2$]$_{13}$—[(CH$_3$)CHCH$_2$]$_{13}$— |
| 389 | —[(C$_3$F$_7$)CHCH$_2$]$_{14}$—[(CH$_3$)CHCH$_2$]$_{14}$— |
| 390 | —[(C$_3$F$_7$)CHCH$_2$]$_{15}$—[(CH$_3$)CHCH$_2$]$_{15}$— |
| 391 | —[(C$_3$F$_7$)CHCH$_2$]$_{16}$—[(CH$_3$)CHCH$_2$]$_{16}$— |
| 392 | —[(C$_3$F$_7$)CHCH$_2$]$_{17}$—[(CH$_3$)CHCH$_2$]$_{17}$— |
| 393 | —[(C$_3$F$_7$)CHCH$_2$]$_{18}$—[(CH$_3$)CHCH$_2$]$_{18}$— |
| 394 | —[(C$_3$F$_7$)CHCH$_2$]$_{19}$—[(CH$_3$)CHCH$_2$]$_{19}$— |
| 395 | —[(C$_3$F$_7$)CHCH$_2$]$_{20}$—[(CH$_3$)CHCH$_2$]$_{20}$— |
| 396 | —[(C$_3$F$_7$)CHCH$_2$]$_{21}$—[(CH$_3$)CHCH$_2$]$_{21}$— |
| 397 | —[(C$_3$F$_7$)CHCH$_2$]$_{22}$—[(CH$_3$)CHCH$_2$]$_{22}$— |
| 398 | —[(C$_3$F$_7$)CHCH$_2$]$_{23}$—[(CH$_3$)CHCH$_2$]$_{23}$— |
| 399 | —[(C$_3$F$_7$)CHCH$_2$]$_{24}$—[(CH$_3$)CHCH$_2$]$_{24}$— |
| 400 | —[(C$_3$F$_7$)CHCH$_2$]$_{25}$—[(CH$_3$)CHCH$_2$]$_{25}$— |
| 401 | —[(C$_3$F$_7$)CHCH$_2$]$_{26}$—[(CH$_3$)CHCH$_2$]$_{26}$— |
| 402 | —[(C$_3$F$_7$)CHCH$_2$]$_{27}$—[(CH$_3$)CHCH$_2$]$_{27}$— |
| 403 | —[(C$_3$F$_7$)CHCH$_2$]$_{28}$—[(CH$_3$)CHCH$_2$]$_{28}$— |
| 404 | —[(C$_3$F$_7$)CHCH$_2$]$_{29}$—[(CH$_3$)CHCH$_2$]$_{29}$— |
| 405 | —[(C$_3$F$_7$)CHCH$_2$]$_{30}$—[(CH$_3$)CHCH$_2$]$_{30}$— |
| 406 | —[(C$_3$F$_7$)CHCH$_2$]$_{31}$—[(CH$_3$)CHCH$_2$]$_{31}$— |
| 407 | —[(C$_3$F$_7$)CHCH$_2$]$_{32}$—[(CH$_3$)CHCH$_2$]$_{32}$— |
| 408 | —[(C$_3$F$_7$)CHCH$_2$]$_{33}$—[(CH$_3$)CHCH$_2$]$_{33}$— |
| 409 | —[(C$_3$F$_7$)CHCH$_2$]$_{34}$—[(CH$_3$)CHCH$_2$]$_{34}$— |
| 410 | —[(C$_3$F$_7$)CHCH$_2$]$_{35}$—[(CH$_3$)CHCH$_2$]$_{35}$— |
| 411 | —[(C$_3$F$_7$)CHCH$_2$]$_{36}$—[(CH$_3$)CHCH$_2$]$_{36}$— |
| 412 | —[(C$_3$F$_7$)CHCH$_2$]$_{37}$—[(CH$_3$)CHCH$_2$]$_{37}$— |
| 413 | —[(C$_3$F$_7$)CHCH$_2$]$_{38}$—[(CH$_3$)CHCH$_2$]$_{38}$— |
| 414 | —[(C$_3$F$_7$)CHCH$_2$]$_{39}$—[(CH$_3$)CHCH$_2$]$_{39}$— |
| 415 | —[(C$_3$F$_7$)CHCH$_2$]$_{40}$—[(CH$_3$)CHCH$_2$]$_{40}$— |
| 416 | —[(C$_4$F$_9$)CHCH$_2$]$_{4}$—[(CH$_3$)CHCH$_2$]$_{4}$— |
| 417 | —[(C$_4$F$_9$)CHCH$_2$]$_{5}$—[(CH$_3$)CHCH$_2$]$_{5}$— |
| 418 | —[(C$_4$F$_9$)CHCH$_2$]$_{6}$—[(CH$_3$)CHCH$_2$]$_{6}$— |
| 419 | —[(C$_4$F$_9$)CHCH$_2$]$_{7}$—[(CH$_3$)CHCH$_2$]$_{7}$— |
| 420 | —[(C$_4$F$_9$)CHCH$_2$]$_{8}$—[(CH$_3$)CHCH$_2$]$_{8}$— |
| 421 | —[(C$_4$F$_9$)CHCH$_2$]$_{9}$—[(CH$_3$)CHCH$_2$]$_{9}$— |
| 422 | —[(C$_4$F$_9$)CHCH$_2$]$_{10}$—[(CH$_3$)CHCH$_2$]$_{10}$— |
| 423 | —[(C$_4$F$_9$)CHCH$_2$]$_{11}$—[(CH$_3$)CHCH$_2$]$_{11}$— |
| 424 | —[(C$_4$F$_9$)CHCH$_2$]$_{12}$—[(CH$_3$)CHCH$_2$]$_{12}$— |
| 425 | —[(C$_4$F$_9$)CHCH$_2$]$_{13}$—[(CH$_3$)CHCH$_2$]$_{13}$— |
| 426 | —[(C$_4$F$_9$)CHCH$_2$]$_{14}$—[(CH$_3$)CHCH$_2$]$_{14}$— |
| 427 | —[(C$_4$F$_9$)CHCH$_2$]$_{15}$—[(CH$_3$)CHCH$_2$]$_{15}$— |
| 428 | —[(C$_4$F$_9$)CHCH$_2$]$_{16}$—[(CH$_3$)CHCH$_2$]$_{16}$— |
| 429 | —[(C$_4$F$_9$)CHCH$_2$]$_{17}$—[(CH$_3$)CHCH$_2$]$_{17}$— |
| 430 | —[(C$_4$F$_9$)CHCH$_2$]$_{18}$—[(CH$_3$)CHCH$_2$]$_{18}$— |
| 431 | —[(C$_4$F$_9$)CHCH$_2$]$_{19}$—[(CH$_3$)CHCH$_2$]$_{19}$— |
| 432 | —[(C$_4$F$_9$)CHCH$_2$]$_{20}$—[(CH$_3$)CHCH$_2$]$_{20}$— |
| 433 | —[(C$_4$F$_9$)CHCH$_2$]$_{21}$—[(CH$_3$)CHCH$_2$]$_{21}$— |
| 434 | —[(C$_4$F$_9$)CHCH$_2$]$_{22}$—[(CH$_3$)CHCH$_2$]$_{22}$— |
| 435 | —[(C$_4$F$_9$)CHCH$_2$]$_{23}$—[(CH$_3$)CHCH$_2$]$_{23}$— |
| 436 | —[(C$_4$F$_9$)CHCH$_2$]$_{24}$—[(CH$_3$)CHCH$_2$]$_{24}$— |
| 437 | —[(C$_4$F$_9$)CHCH$_2$]$_{25}$—[(CH$_3$)CHCH$_2$]$_{25}$— |
| 438 | —[(C$_4$F$_9$)CHCH$_2$]$_{26}$—[(CH$_3$)CHCH$_2$]$_{26}$— |
| 439 | —[(C$_4$F$_9$)CHCH$_2$]$_{27}$—[(CH$_3$)CHCH$_2$]$_{27}$— |
| 440 | —[(C$_4$F$_9$)CHCH$_2$]$_{28}$—[(CH$_3$)CHCH$_2$]$_{28}$— |
| 441 | —[(C$_4$F$_9$)CHCH$_2$]$_{29}$—[(CH$_3$)CHCH$_2$]$_{29}$— |
| 442 | —[(C$_4$F$_9$)CHCH$_2$]$_{30}$—[(CH$_3$)CHCH$_2$]$_{30}$— |
| 443 | —[(C$_4$F$_9$)CHCH$_2$]$_{31}$—[(CH$_3$)CHCH$_2$]$_{31}$— |
| 444 | —[(C$_4$F$_9$)CHCH$_2$]$_{32}$—[(CH$_3$)CHCH$_2$]$_{32}$— |
| 445 | —[(C$_4$F$_9$)CHCH$_2$]$_{33}$—[(CH$_3$)CHCH$_2$]$_{33}$— |
| 446 | —[(C$_4$F$_9$)CHCH$_2$]$_{34}$—[(CH$_3$)CHCH$_2$]$_{34}$— |
| 447 | —[(C$_4$F$_9$)CHCH$_2$]$_{35}$—[(CH$_3$)CHCH$_2$]$_{35}$— |
| 448 | —[(C$_4$F$_9$)CHCH$_2$]$_{36}$—[(CH$_3$)CHCH$_2$]$_{36}$— |
| 449 | —[(C$_4$F$_9$)CHCH$_2$]$_{37}$—[(CH$_3$)CHCH$_2$]$_{37}$— |
| 450 | —[(C$_4$F$_9$)CHCH$_2$]$_{38}$—[(CH$_3$)CHCH$_2$]$_{38}$— |
| 451 | —[(C$_4$F$_9$)CHCH$_2$]$_{39}$—[(CH$_3$)CHCH$_2$]$_{39}$— |
| 452 | —[(C$_4$F$_9$)CHCH$_2$]$_{40}$—[(CH$_3$)CHCH$_2$]$_{40}$— |
| 453 | —[(C$_5$F$_{11}$)CHCH$_2$]$_{4}$—[(CH$_3$)CHCH$_2$]$_{4}$— |
| 454 | —[(C$_5$F$_{11}$)CHCH$_2$]$_{5}$—[(CH$_3$)CHCH$_2$]$_{5}$— |
| 455 | —[(C$_5$F$_{11}$)CHCH$_2$]$_{6}$—[(CH$_3$)CHCH$_2$]$_{6}$— |
| 456 | —[(C$_5$F$_{11}$)CHCH$_2$]$_{7}$—[(CH$_3$)CHCH$_2$]$_{7}$— |
| 457 | —[(C$_5$F$_{11}$)CHCH$_2$]$_{8}$—[(CH$_3$)CHCH$_2$]$_{8}$— |
| 458 | —[(C$_5$F$_{11}$)CHCH$_2$]$_{9}$—[(CH$_3$)CHCH$_2$]$_{9}$— |
| 459 | —[(C$_5$F$_{11}$)CHCH$_2$]$_{10}$—[(CH$_3$)CHCH$_2$]$_{10}$— |
| 460 | —[(C$_5$F$_{11}$)CHCH$_2$]$_{11}$—[(CH$_3$)CHCH$_2$]$_{11}$— |
| 461 | —[(C$_5$F$_{11}$)CHCH$_2$]$_{12}$—[(CH$_3$)CHCH$_2$]$_{12}$— |
| 462 | —[(C$_5$F$_{11}$)CHCH$_2$]$_{13}$—[(CH$_3$)CHCH$_2$]$_{13}$— |
| 463 | —[(C$_5$F$_{11}$)CHCH$_2$]$_{14}$—[(CH$_3$)CHCH$_2$]$_{14}$— |
| 464 | —[(C$_5$F$_{11}$)CHCH$_2$]$_{15}$—[(CH$_3$)CHCH$_2$]$_{15}$— |
| 465 | —[(C$_5$F$_{11}$)CHCH$_2$]$_{16}$—[(CH$_3$)CHCH$_2$]$_{16}$— |
| 466 | —[(C$_5$F$_{11}$)CHCH$_2$]$_{17}$—[(CH$_3$)CHCH$_2$]$_{17}$— |
| 467 | —[(C$_5$F$_{11}$)CHCH$_2$]$_{18}$—[(CH$_3$)CHCH$_2$]$_{18}$— |
| 468 | —[(C$_5$F$_{11}$)CHCH$_2$]$_{19}$—[(CH$_3$)CHCH$_2$]$_{19}$— |
| 469 | —[(C$_5$F$_{11}$)CHCH$_2$]$_{20}$—[(CH$_3$)CHCH$_2$]$_{20}$— |
| 470 | —[(C$_5$F$_{11}$)CHCH$_2$]$_{21}$—[(CH$_3$)CHCH$_2$]$_{21}$— |
| 471 | —[(C$_5$F$_{11}$)CHCH$_2$]$_{22}$—[(CH$_3$)CHCH$_2$]$_{22}$— |
| 472 | —[(C$_5$F$_{11}$)CHCH$_2$]$_{23}$—[(CH$_3$)CHCH$_2$]$_{23}$— |
| 473 | —[(C$_5$F$_{11}$)CHCH$_2$]$_{24}$—[(CH$_3$)CHCH$_2$]$_{24}$— |
| 474 | —[(C$_5$F$_{11}$)CHCH$_2$]$_{25}$—[(CH$_3$)CHCH$_2$]$_{25}$— |
| 475 | —[(C$_5$F$_{11}$)CHCH$_2$]$_{26}$—[(CH$_3$)CHCH$_2$]$_{26}$— |
| 476 | —[(C$_5$F$_{11}$)CHCH$_2$]$_{27}$—[(CH$_3$)CHCH$_2$]$_{27}$— |
| 477 | —[(C$_5$F$_{11}$)CHCH$_2$]$_{28}$—[(CH$_3$)CHCH$_2$]$_{28}$— |
| 478 | —[(C$_5$F$_{11}$)CHCH$_2$]$_{29}$—[(CH$_3$)CHCH$_2$]$_{29}$— |
| 479 | —[(C$_5$F$_{11}$)CHCH$_2$]$_{30}$—[(CH$_3$)CHCH$_2$]$_{30}$— |
| 480 | —[(C$_5$F$_{11}$)CHCH$_2$]$_{31}$—[(CH$_3$)CHCH$_2$]$_{31}$— |
| 481 | —[(C$_5$F$_{11}$)CHCH$_2$]$_{32}$—[(CH$_3$)CHCH$_2$]$_{32}$— |
| 482 | —[(C$_5$F$_{11}$)CHCH$_2$]$_{33}$—[(CH$_3$)CHCH$_2$]$_{33}$— |

| EX | LUBRICANT |
|---|---|
| 483 | $-[(C_5F_{11})CHCH_2]_{34}-[(CH_3)CHCH_2]_{34}-$ |
| 484 | $-[(C_5F_{11})CHCH_2]_{35}-[(CH_3)CHCH_2]_{35}-$ |
| 485 | $-[(C_5F_{11})CHCH_2]_{36}-[(CH_3)CHCH_2]_{36}-$ |
| 486 | $-[(C_5F_{11})CHCH_2]_{37}-[(CH_3)CHCH_2]_{37}-$ |
| 487 | $-[(C_5F_{11})CHCH_2]_{38}-[(CH_3)CHCH_2]_{38}-$ |
| 488 | $-[(C_5F_{11})CHCH_2]_{39}-[(CH_3)CHCH_2]_{39}-$ |
| 489 | $-[(C_5F_{11})CHCH_2]_{40}-[(CH_3)CHCH_2]_{40}-$ |
| 490 | $-[(C_6F_{13})CHCH_2]_4-[(CH_3)CHCH_2]_4-$ |
| 491 | $-[(C_6F_{13})CHCH_2]_5-[(CH_3)CHCH_2]_5-$ |
| 492 | $-[(C_6F_{13})CHCH_2]_6-[(CH_3)CHCH_2]_6-$ |
| 493 | $-[(C_6F_{13})CHCH_2]_7-[(CH_3)CHCH_2]_7-$ |
| 494 | $-[(C_6F_{13})CHCH_2]_8-[(CH_3)CHCH_2]_8-$ |
| 495 | $-[(C_6F_{13})CHCH_2]_9-[(CH_3)CHCH_2]_9-$ |
| 496 | $-[(C_6F_{13})CHCH_2]_{10}-[(CH_3)CHCH_2]_{10}-$ |
| 497 | $-[(C_6F_{13})CHCH_2]_{11}-[(CH_3)CHCH_2]_{11}-$ |
| 498 | $-[(C_6F_{13})CHCH_2]_{12}-[(CH_3)CHCH_2]_{12}-$ |
| 499 | $-[(C_6F_{13})CHCH_2]_{13}-[(CH_3)CHCH_2]_{13}-$ |
| 500 | $-[(C_6F_{13})CHCH_2]_{14}-[(CH_3)CHCH_2]_{14}-$ |
| 501 | $-[(C_6F_{13})CHCH_2]_{15}-[(CH_3)CHCH_2]_{15}-$ |
| 502 | $-[(C_6F_{13})CHCH_2]_{16}-[(CH_3)CHCH_2]_{16}-$ |
| 503 | $-[(C_6F_{13})CHCH_2]_{17}-[(CH_3)CHCH_2]_{17}-$ |
| 504 | $-[(C_6F_{13})CHCH_2]_{18}-[(CH_3)CHCH_2]_{18}-$ |
| 505 | $-[(C_6F_{13})CHCH_2]_{19}-[(CH_3)CHCH_2]_{19}-$ |
| 506 | $-[(C_6F_{13})CHCH_2]_{20}-[(CH_3)CHCH_2]_{20}-$ |
| 507 | $-[(C_6F_{13})CHCH_2]_{21}-[(CH_3)CHCH_2]_{21}-$ |
| 508 | $-[(C_6F_{13})CHCH_2]_{22}-[(CH_3)CHCH_2]_{22}-$ |
| 509 | $-[(C_6F_{13})CHCH_2]_{23}-[(CH_3)CHCH_2]_{23}-$ |
| 510 | $-[(C_6F_{13})CHCH_2]_{24}-[(CH_3)CHCH_2]_{24}-$ |
| 511 | $-[(C_6F_{13})CHCH_2]_{25}-[(CH_3)CHCH_2]_{25}-$ |
| 512 | $-[(C_6F_{13})CHCH_2]_{26}-[(CH_3)CHCH_2]_{26}-$ |
| 513 | $-[(C_6F_{13})CHCH_2]_{27}-[(CH_3)CHCH_2]_{27}-$ |
| 514 | $-[(C_6F_{13})CHCH_2]_{28}-[(CH_3)CHCH_2]_{28}-$ |
| 515 | $-[(C_6F_{13})CHCH_2]_{29}-[(CH_3)CHCH_2]_{29}-$ |
| 516 | $-[(C_6F_{13})CHCH_2]_{30}-[(CH_3)CHCH_2]_{30}-$ |
| 517 | $-[(C_6F_{13})CHCH_2]_{31}-[(CH_3)CHCH_2]_{31}-$ |
| 518 | $-[(C_6F_{13})CHCH_2]_{32}-[(CH_3)CHCH_2]_{32}-$ |
| 519 | $-[(C_6F_{13})CHCH_2]_{33}-[(CH_3)CHCH_2]_{33}-$ |
| 520 | $-[(C_6F_{13})CHCH_2]_{34}-[(CH_3)CHCH_2]_{34}-$ |
| 521 | $-[(C_6F_{13})CHCH_2]_{35}-[(CH_3)CHCH_2]_{35}-$ |
| 522 | $-[(C_6F_{13})CHCH_2]_{36}-[(CH_3)CHCH_2]_{36}-$ |
| 523 | $-[(C_6F_{13})CHCH_2]_{37}-[(CH_3)CHCH_2]_{37}-$ |
| 524 | $-[(C_6F_{13})CHCH_2]_{38}-[(CH_3)CHCH_2]_{38}-$ |
| 525 | $-[(C_6F_{13})CHCH_2]_{39}-[(CH_3)CHCH_2]_{39}-$ |
| 526 | $-[(C_6F_{13})CHCH_2]_{40}-[(CH_3)CHCH_2]_{40}-$ |
| 527 | $-[(C_7F_{15})CHCH_2]_4-[(CH_3)CHCH_2]_4-$ |
| 528 | $-[(C_7F_{15})CHCH_2]_5-[(CH_3)CHCH_2]_5-$ |
| 529 | $-[(C_7F_{15})CHCH_2]_6-[(CH_3)CHCH_2]_6-$ |
| 530 | $-[(C_7F_{15})CHCH_2]_7-[(CH_3)CHCH_2]_7-$ |
| 531 | $-[(C_7F_{15})CHCH_2]_8-[(CH_3)CHCH_2]_8-$ |
| 532 | $-[(C_7F_{15})CHCH_2]_9-[(CH_3)CHCH_2]_9-$ |
| 533 | $-[(C_7F_{15})CHCH_2]_{10}-[(CH_3)CHCH_2]_{10}-$ |
| 534 | $-[(C_7F_{15})CHCH_2]_{11}-[(CH_3)CHCH_2]_{11}-$ |
| 535 | $-[(C_7F_{15})CHCH_2]_{12}-[(CH_3)CHCH_2]_{12}-$ |
| 536 | $-[(C_7F_{15})CHCH_2]_{13}-[(CH_3)CHCH_2]_{13}-$ |
| 537 | $-[(C_7F_{15})CHCH_2]_{14}-[(CH_3)CHCH_2]_{14}-$ |
| 538 | $-[(C_7F_{15})CHCH_2]_{15}-[(CH_3)CHCH_2]_{15}-$ |
| 539 | $-[(C_7F_{15})CHCH_2]_{16}-[(CH_3)CHCH_2]_{16}-$ |
| 540 | $-[(C_7F_{15})CHCH_2]_{17}-[(CH_3)CHCH_2]_{17}-$ |
| 541 | $-[(C_7F_{15})CHCH_2]_{18}-[(CH_3)CHCH_2]_{18}-$ |
| 542 | $-[(C_7F_{15})CHCH_2]_{19}-[(CH_3)CHCH_2]_{19}-$ |
| 543 | $-[(C_7F_{15})CHCH_2]_{20}-[(CH_3)CHCH_2]_{20}-$ |
| 544 | $-[(C_7F_{15})CHCH_2]_{21}-[(CH_3)CHCH_2]_{21}-$ |
| 545 | $-[(C_7F_{15})CHCH_2]_{22}-[(CH_3)CHCH_2]_{22}-$ |
| 546 | $-[(C_7F_{15})CHCH_2]_{23}-[(CH_3)CHCH_2]_{23}-$ |
| 547 | $-[(C_7F_{15})CHCH_2]_{24}-[(CH_3)CHCH_2]_{24}-$ |
| 548 | $-[(C_7F_{15})CHCH_2]_{25}-[(CH_3)CHCH_2]_{25}-$ |
| 549 | $-[(C_7F_{15})CHCH_2]_{26}-[(CH_3)CHCH_2]_{26}-$ |
| 550 | $-[(C_7F_{15})CHCH_2]_{27}-[(CH_3)CHCH_2]_{27}-$ |
| 551 | $-[(C_7F_{15})CHCH_2]_{28}-[(CH_3)CHCH_2]_{28}-$ |
| 552 | $-[(C_7F_{15})CHCH_2]_{29}-[(CH_3)CHCH_2]_{29}-$ |
| 553 | $-[(C_7F_{15})CHCH_2]_{30}-[(CH_3)CHCH_2]_{30}-$ |
| 554 | $-[(C_7F_{15})CHCH_2]_{31}-[(CH_3)CHCH_2]_{31}-$ |
| 555 | $-[(C_7F_{15})CHCH_2]_{32}-[(CH_3)CHCH_2]_{32}-$ |
| 556 | $-[(C_7F_{15})CHCH_2]_{33}-[(CH_3)CHCH_2]_{33}-$ |
| 557 | $-[(C_7F_{15})CHCH_2]_{34}-[(CH_3)CHCH_2]_{34}-$ |
| 558 | $-[(C_7F_{15})CHCH_2]_{35}-[(CH_3)CHCH_2]_{35}-$ |
| 559 | $-[(C_7F_{15})CHCH_2]_{36}-[(CH_3)CHCH_2]_{36}-$ |
| 560 | $-[(C_7F_{15})CHCH_2]_{37}-[(CH_3)CHCH_2]_{37}-$ |
| 561 | $-[(C_7F_{15})CHCH_2]_{38}-[(CH_3)CHCH_2]_{38}-$ |
| 562 | $-[(C_7F_{15})CHCH_2]_{39}-[(CH_3)CHCH_2]_{39}-$ |
| 563 | $-[(C_7F_{15})CHCH_2]_{40}-[(CH_3)CHCH_2]_{40}-$ |
| 564 | $-[(C_8F_{17})CHCH_2]_4-[(CH_3)CHCH_2]_4-$ |
| 565 | $-[(C_8F_{17})CHCH_2]_5-[(CH_3)CHCH_2]_5-$ |
| 566 | $-[(C_8F_{17})CHCH_2]_6-[(CH_3)CHCH_2]_6-$ |
| 567 | $-[(C_8F_{17})CHCH_2]_7-[(CH_3)CHCH_2]_7-$ |
| 568 | $-[(C_8F_{17})CHCH_2]_8-[(CH_3)CHCH_2]_8-$ |
| 569 | $-[(C_8F_{17})CHCH_2]_9-[(CH_3)CHCH_2]_9-$ |
| 570 | $-[(C_8F_{17})CHCH_2]_{10}-[(CH_3)CHCH_2]_{10}-$ |
| 571 | $-[(C_8F_{17})CHCH_2]_{11}-[(CH_3)CHCH_2]_{11}-$ |
| 572 | $-[(C_8F_{17})CHCH_2]_{12}-[(CH_3)CHCH_2]_{12}-$ |
| 573 | $-[(C_8F_{17})CHCH_2]_{13}-[(CH_3)CHCH_2]_{13}-$ |
| 574 | $-[(C_8F_{17})CHCH_2]_{14}-[(CH_3)CHCH_2]_{14}-$ |
| 575 | $-[(C_8F_{17})CHCH_2]_{15}-[(CH_3)CHCH_2]_{15}-$ |
| 576 | $-[(C_8F_{17})CHCH_2]_{16}-[(CH_3)CHCH_2]_{16}-$ |
| 577 | $-[(C_8F_{17})CHCH_2]_{17}-[(CH_3)CHCH_2]_{17}-$ |
| 578 | $-[(C_8F_{17})CHCH_2]_{18}-[(CH_3)CHCH_2]_{18}-$ |
| 579 | $-[(C_8F_{17})CHCH_2]_{19}-[(CH_3)CHCH_2]_{19}-$ |
| 580 | $-[(C_8F_{17})CHCH_2]_{20}-[(CH_3)CHCH_2]_{20}-$ |
| 581 | $-[(C_8F_{17})CHCH_2]_{21}-[(CH_3)CHCH_2]_{21}-$ |
| 582 | $-[(C_8F_{17})CHCH_2]_{22}-[(CH_3)CHCH_2]_{22}-$ |
| 583 | $-[(C_8F_{17})CHCH_2]_{23}-[(CH_3)CHCH_2]_{23}-$ |
| 584 | $-[(C_8F_{17})CHCH_2]_{24}-[(CH_3)CHCH_2]_{24}-$ |
| 585 | $-[(C_8F_{17})CHCH_2]_{25}-[(CH_3)CHCH_2]_{25}-$ |
| 586 | $-[(C_8F_{17})CHCH_2]_{26}-[(CH_3)CHCH_2]_{26}-$ |
| 587 | $-[(C_8F_{17})CHCH_2]_{27}-[(CH_3)CHCH_2]_{27}-$ |
| 588 | $-[(C_8F_{17})CHCH_2]_{28}-[(CH_3)CHCH_2]_{28}-$ |
| 589 | $-[(C_8F_{17})CHCH_2]_{29}-[(CH_3)CHCH_2]_{29}-$ |
| 590 | $-[(C_8F_{17})CHCH_2]_{30}-[(CH_3)CHCH_2]_{30}-$ |
| 591 | $-[(C_8F_{17})CHCH_2]_{31}-[(CH_3)CHCH_2]_{31}-$ |
| 592 | $-[(C_8F_{17})CHCH_2]_{32}-[(CH_3)CHCH_2]_{32}-$ |
| 593 | $-[(C_8F_{17})CHCH_2]_{33}-[(CH_3)CHCH_2]_{33}-$ |
| 594 | $-[(C_8F_{17})CHCH_2]_{34}-[(CH_3)CHCH_2]_{34}-$ |
| 595 | $-[(C_8F_{17})CHCH_2]_{35}-[(CH_3)CHCH_2]_{35}-$ |
| 596 | $-[(C_8F_{17})CHCH_2]_{36}-[(CH_3)CHCH_2]_{36}-$ |
| 597 | $-[(C_8F_{17})CHCH_2]_{37}-[(CH_3)CHCH_2]_{37}-$ |
| 598 | $-[(C_8F_{17})CHCH_2]_{38}-[(CH_3)CHCH_2]_{38}-$ |
| 599 | $-[(C_8F_{17})CHCH_2]_{39}-[(CH_3)CHCH_2]_{39}-$ |
| 600 | $-[(C_8F_{17})CHCH_2]_{40}-[(CH_3)CHCH_2]_{40}-$ |

Having described the invention in detail and by reference to preferred embodiments thereof, it will be apparent that modifications and variations are possible without departing from the scope of the invention defined in the appended claims.

What is claimed is:

1. A composition for use in compression refrigeration and air-conditioning comprising:

(a) at least one refrigerant selected from the group consisting of hydrofluorocarbon, hydrochlorofluorocarbon, fluorocarbon, and chlorofluorocarbon; and (b) a sufficient amount to provide lubrication of at least one lubricant of the formula

$$-[(R_f)CHCH_2]_m-[(R)CHCH_2]_n-$$

where m is 4 to 40; n=m; $R_f$ is perfluoroalkyl group having 1 to 8 carbon atoms; and R is alkyl of 1 carbon atom wherein said lubricant has a molecular weight between about 300 and about 3,000, has a viscosity of about 5 to about 150 centistokes at 37° C., is miscible in combination with said refrigerant in the range between about −40° C. and at least about +20° C., and the perfluoroalkyl and alkyl groups are pendant groups wherein of the total number of the pendant groups, at least 40% of the pendant groups are perfluoroalkyl groups.

2. A method for improving lubrication in compression refrigeration and air-conditioning equipment using a refrigerant selected from the group consisting of hydrofluorocarbon, hydrochlorofluorocarbon, fluorocarbon, and chlorofluorocarbon comprising the step of:

employing a sufficient amount to provide lubrication of at least one lubricant of the formula —[(R$_f$)CHCH$_2$]$_m$—[(R)CHCH$_2$]$_n$— where m is 4 to 40; n=m; R$_f$ is perfluoroalkyl group having 1 to 8 carbon atoms; a R is alkyl of 1 carbon atom wherein said lubricant has a molecular weight between about 300 and about 3,000, has a viscosity of about 5 to about 150 centistokes at 37° C., is miscible in combination with said refrigerant in the range between about −40° C. and at least about +20° C., and the perfluoroalkyl and alkyl groups are pendant groups wherein of the total number of the pendant groups, at least 40% of the pendant groups are perfluoroalkyl groups.

* * * * *